US005666733A

United States Patent [19]

Nitschmann

[11] Patent Number: 5,666,733

[45] Date of Patent: Sep. 16, 1997

[54] GUIDE BAR FOR A MOTOR CHAINSAW

[75] Inventor: Karl Nitschmann, Schorndorf, Germany

[73] Assignee: Andreas Stihl, Waiblingen, Germany

[21] Appl. No.: 516,759

[22] Filed: Aug. 18, 1995

[30] Foreign Application Priority Data

Aug. 18, 1994 [DE] Germany ........................ 44 29 348.8

[51] Int. Cl.$^6$ ........................ B23D 57/02; B27B 17/02

[52] U.S. Cl. ........................ 30/387; 30/383

[58] Field of Search ........................ 30/383, 387, 384, 30/396

[56] References Cited

U.S. PATENT DOCUMENTS 4,961,263 10/1990 Apfel et al. ........................ 30/387

5,014,435 5/1991 Date et al. ........................ 30/387

5,345,686 9/1994 Zimmerman ........................ 30/383 X

*Primary Examiner*—Douglas D. Watts

*Attorney, Agent, or Firm*—Robert W. Becker & Associates

[57] ABSTRACT

A guide bar for a saw chain of a motor chainsaw has two side plates having a longitudinal extension. At least one longitudinal stay for fixedly connecting the side plates to one another is provided such that the side plates are positioned substantially congruent and parallel to one another and define a peripheral guide groove therebetween. The longitudinal stay preferably extends in a direction of the longitudinal extension over most of the longitudinal extension of the side plates. The longitudinal stay has contact surfaces and the side plates have support surfaces extending perpendicular to the center plane of the guide bar extending parallel to the side plates. The contact surfaces rest on the support surfaces.

19 Claims, 5 Drawing Sheets

GUIDE BAR FOR A MOTOR CHAINSAW

BACKGROUND OF THE INVENTION

The present invention relates to a guide bar for a motor chainsaw. It comprises a circumferential guide groove for the saw chain whereby the guide groove is delimited by two side plates forming the guide bar. The side plates are approximately congruent to one another, spaced apart by a distance, and fixedly connected to one another.

Such a sandwich-type guide bar is known from U.S. Pat. No. 5,014,435. Between the two side plates an intermediate plate in the form of a spacer is provided which, together with the side plates, is fixed in its position with a potting compound such as a synthetic resin. It is possible to provide openings in the side plates as well as in the intermediate plate in order to reduce weight which openings are filled during pouring of the resin with the resin. In practice it has been demonstrated that each one of the openings in the side plates which results in a weight reduction at the same time reduces the torsional stiffness so that the handling of the guide bar is unfavorably affected. On the other hand, smaller openings result in a satisfactory torsional stiffness but also result in a greater weight of the guide bar so that the usability of the motor chainsaw is unfavorably affected.

It is therefore an object of the present invention to provide a guide bar of the aforementioned kind such that for a low weight a high torsional stiffness can be achieved.

SUMMARY OF THE INVENTION

The guide bar of the present invention for a saw chain of a motor chainsaw is primarily characterized by:

Two side plates having a longitudinal extension;

At least one longitudinal stay for fixedly connecting the side plates to one another such that the side plates are positioned substantially congruent and parallel to one another and define a peripheral guide groove therebetween;

The longitudinal stay extending in a direction of the longitudinal extension over most of the longitudinal extension of the side plates;

The longitudinal stay having contact surfaces; and

The side plates having support surfaces extending perpendicular to a center plane of the guide bar extending parallel to the side plates; and The contact surfaces resting on the support surfaces.

Advantageously, the longitudinal stay is connected to the side plates in a positive locking manner.

Expediently, the longitudinal stay is positioned substantially along a longitudinal center axis of the guide bar.

Preferably, the longitudinal stay is a spacer between the side plates.

In another embodiment of the present invention the guide bar further comprises fastening means for fastening the longitudinal stay to the side plates.

Advantageously, the longitudinal stay comprises rivet flanges extending between the side plates in the center plane.

Preferably, the rivet flanges are spacers.

In yet another embodiment of the present invention, the longitudinal stay comprises transverse stays extending perpendicular to the center plane, wherein the contact surfaces are located at the transverse stays.

Preferably, the transverse stays are in the form of rivet bolts.

Advantageously, a plurality of longitudinal stays are arranged parallel to one another.

In yet another embodiment of the present invention the side plates have recesses and the support surfaces are located at the recesses.

Preferably, the contact surfaces and the support surfaces extend over the entire length of the longitudinal stay.

In a preferred embodiment of the present invention the longitudinal stay is a part of a profiled member.

Advantageously, the profiled member is S-shaped and has three parallel sections extending perpendicular to the center plane and two connecting sections extending perpendicular to the three parallel sections for connecting respectively two adjacently arranged ones of the three parallel sections, wherein each one of the connecting sections is positioned in a plane of the side plates.

Preferably, each one of the side plates has a receiving opening for receiving one of the connecting sections, wherein the connecting sections and the receiving openings have a matching shape such that a surface of the connecting sections facing outwardly with respect to the guide bar are flush with an exterior sidewall of the side plates.

Expediently, the receiving opening of one of the side plates is displaced relative to the receiving opening of the other side plate.

Advantageously, the receiving opening in the one side plate, when the side plates are positioned vertically and a longitudinal center axis of the guide bar extends horizontally, is positioned above the longitudinal center axis of the guide bar and the other receiving opening is positioned below the longitudinal center axis.

In a preferred embodiment of the present invention the outwardly positioned ones of the three parallel sections have free end faces with transverse stays in the form of rivet projections. The side plates have cutouts in the form of rivet openings. The transverse stays extend into the cutouts for riveting.

The outwardly positioned ones of the three parallel sections in another embodiment of the present invention have outwardly facing surfaces with outwardly extending rivet flanges extending in the center plane of the guide bar for riveting the side plates to the profiled member.

Advantageously, the longitudinal stay is a hollow member.

Preferably, the guide bar further comprises a first and a second spacing member wherein the longitudinal stay has a first and a second end and the first spacing member is connected to the first end and the second spacing member is connected to the second end. The first and second spacing members are positioned between the side plates and the first and second spacing members have an outer edge that delimits the depth of the guide groove.

The longitudinal stay positioned between the side plates is a component of a high torsional stiffness which via the contact and support surfaces is transmitted to the guide bar itself so that for a low weight a high torsional stiffness is provided.

Preferably, the longitudinal stay engages the side plates in the center plane of the guide bar in a positive locking manner whereby this positive locking engagement is provided in the longitudinal direction as well as transverse to the longitudinal direction of the guide bar. The guide bar and the longitudinal stay are fixedly connected so that torsional forces applied to any of the side plates is directly transmitted via the contact and support surfaces onto the longitudinal stay which stiffens the guide bar.

In an advantageous embodiment of the invention the longitudinal stay is fixedly connected to the side plates with fastening means such as adhesives, welding, soldering, brazing, etc. It is also possible to provide a rivet connection. Advantageously, the connection can also be provided by a snap connection, a catch connection etc. with positive locking engagement.

Preferably, the longitudinal stay is provided with a transverse stay extending perpendicular to the center plane of the guide bar which transverse stay, on the one hand, is provided with the contact surfaces and, on the other hand, is embodied as a riveting bolt. These riveting bolts engage cutouts of the side plates so that after assembly of the side plates with the longitudinal stay and axial compression of the transverse stays a riveting connecting is provided which ensures a fixed connection of the side plates with the longitudinal stay. This fixed connection in cooperation with the contact surfaces and the longitudinally extending stay of the guide bar results in an increased torsional stiffness of the guide bar.

In another embodiment of the invention the longitudinal stay is part of a profiled member which is preferably S-shaped. The three parallel sections are positioned perpendicular to the center plane of the guide bar and the two connecting sections are positioned at a right angle to these parallel sections and are located in a plane of a side plate, respectively. In this embodiment it is suggested that the connecting sections of the S-shaped profiled member fill a longitudinal receiving opening of the side plates and are preferably positioned flush with the exterior sidewall of the side plates so as to provide a substantially planar exterior side surface of the guide bar.

BRIEF DESCRIPTION OF THE DRAWINGS

The object and advantages of the present invention will appear more clearly from the following specification in conjunction with the accompanying drawings, in which.

DESCRIPTION OF THE PREFERRED EMBODIMENTS

The present invention will now be described in detail with the aid of several specific embodiments utilizing FIGS. 1 through 11.

Figure 1:
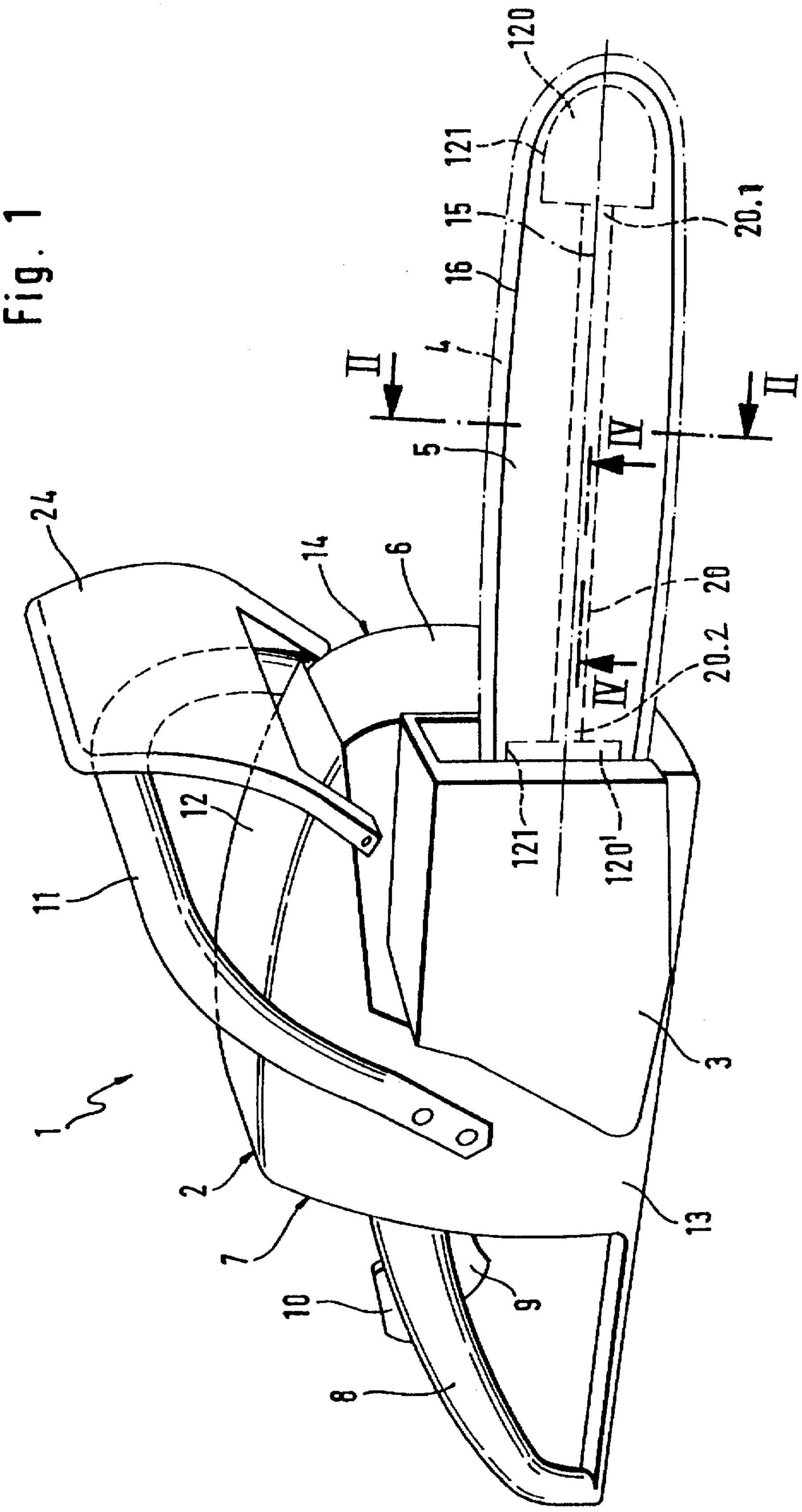
FIG. 1 shows a perspective view of a motor chainsaw with a guide bar.

The motor chainsaw 1 represented in FIG. 1 has a housing 2 in which a non-represented drive motor, preferably an internal combustion engine, is arranged. This internal combustion engine drives via a chain wheel covered by a cover 3 a saw chain 4 which circulates in a circumferential guide groove 16 of a sword-shaped guide bar 5. This guide bar 5 extends in the longitudinal direction of the motor chain saw 1 from its forward end face 6 in the forward direction. At the rear end face 7 of the housing, which is facing away from the guide bar 5, a rear grip 8 with throttle lever 9 and throttle lock 10 is arranged. At the forward portion of the motor chainsaw a grip bracket 11 is provided which extends from one housing side 13 across the housing top 12 to the other housing side 14. In front of the grip bracket 11 a protective bracket 16 is arranged which serves as a release for a safety brake device for shutting down the saw chain 4.

Figure 2:
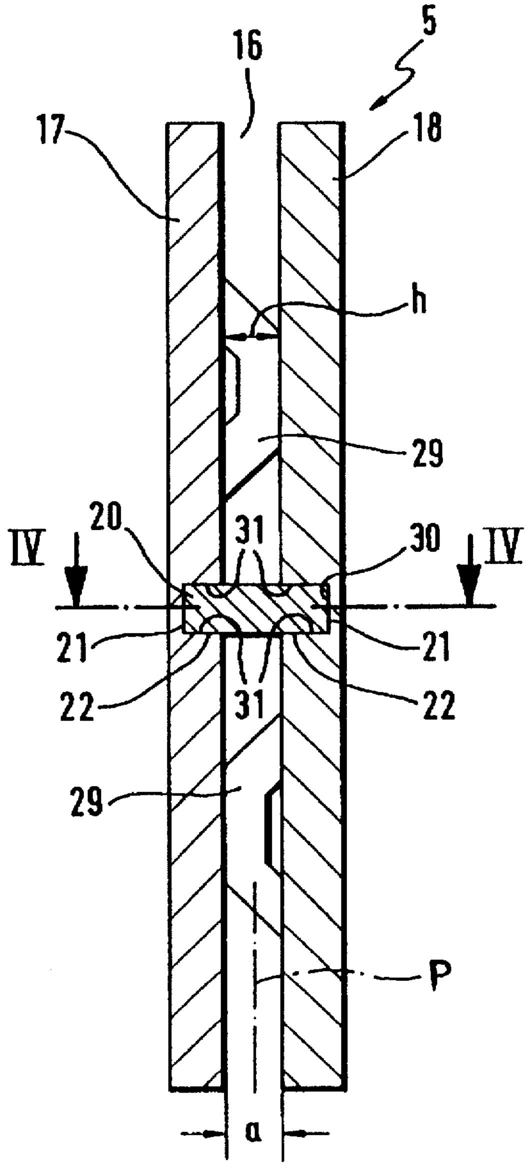
FIG. 2 shows a section along the line II—II of FIG. 1.

As can be seen in the cross-sectional view of FIG. 2 the guide groove 16 is delimited by two side plates 17, 18 which form the guide bar 5. The side plates 17, 18 are positioned approximately congruent to one another and are spaced at a distance "a" which corresponds to the width of the guide groove 16.

As can be seen from FIGS. 1 and 2, between the side plates 17, 18 a longitudinal stay 20 is arranged which extends over most of the length of the guide bar 5 (FIG. 1). This longitudinal stay, as can be seen in FIG. 2, may have a rectangular cross-section. The longitudinal stay can also be in the form of a hollow member. In the shown embodiment, however, the longitudinal stay is a massive member and has a substantially rectangular cross-section. The material of the longitudinal stay can be of a lighter specific weight than the side plates. The side plates can be manufactured of steel while the longitudinal stay may be manufactured of aluminum, an aluminum alloy, plastic (for example, reinforced plastic), or similar suitable materials.

The longitudinal stay 20 is arranged at the level of the longitudinal center axis 15 of the guide bar 5 whereby the longitudinal stay 20 functions simultaneously as a spacer between the side plates 17, 18. In FIG. 2 above and below the longitudinal stay 20 further spacers 19 are provided which can be formed from the material of the side plates 17, 18 by stamping etc. They have a height "h" which corresponds to the distance "a" between the side plates 17, 18.

Figure 4:
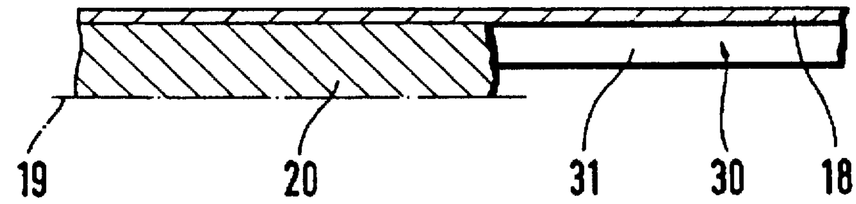
FIG. 4 shows a section along the line IV—IV of FIGS. 1 and 2.

The longitudinal stay 20 in the shown embodiment of FIG. 2 engages with its narrow side 21 a recess 30 which is provided in each one of the side plates 17, 18. As shown in FIG. 4, these recesses 30 are in the form of grooves extending across the side plates over the length of the longitudinal stay 20. The groove walls which extend perpendicular to the center plane P of the guide bar 5 form the support surfaces 31 at which the contact surfaces 22 of the longitudinal stay 20 rest. Preferably, the longitudinal stay is positioned with its narrow sides 21 substantially with exact fit in the recess 30 so that a substantially play-free contact of the contact surfaces 22 at the support surfaces 31 is ensured. In the longitudinal direction the longitudinal stay 20 rests preferably with its end faces at the end faces of the groove. In order to provide for a flush abutment it may be advantageous to glue the longitudinal stay 20 into the recess 30 so that at the same time a fixed connection of the two side plates 17, 18 with one another via the longitudinal stay 20 is achieved. The thus formed fixed assembly of side plates 17, 18 and longitudinal stay 20 has a high torsional stiffness because the longitudinal stay 20, which itself has a high torsional stiffness, functions due to its positive locking engagement of the side plates as a stiffening means when bending moments (torsional forces) about the longitudinal axis 15 of the guide bar 5 occur. The contact surface 22 and also the coordinated support surface 31 extend substantially over the entire length of the longitudinal stay 20.

Figure 5:
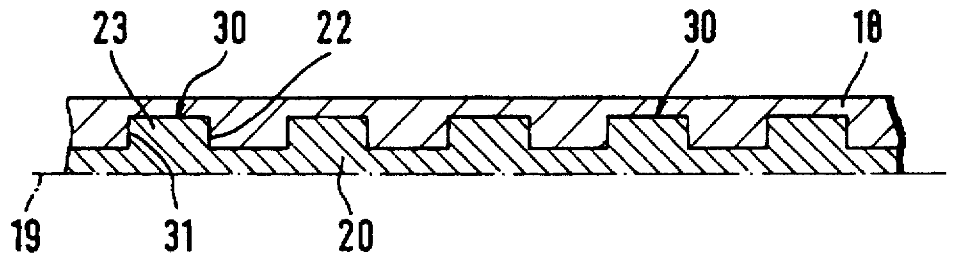
FIG. 5 shows a further embodiment of the inventive guide bar in section.

In another embodiment according to FIG. 5 the longitudinal stay 20 may be provided with transverse stays 23 which extend substantially perpendicularly to the center plane P of the guide bar and are provided with the contact surfaces 22. The transverse stays 23 each engage a recess 30 for which purpose over the length of the longitudinal stay 20 a plurality of recesses 30 are arranged in series one after another. Preferably, the recesses 30 are positioned at the same distance relative to one another so that for engaging of the longitudinal stay 20, respectively, of the transverse stays 23 in the recesses 30 no preferred positioning is needed. The rod-shaped longitudinal stay 20 can thus be inserted in any position in order to achieve a positive locking engagement of the side plates.

Figure 6:
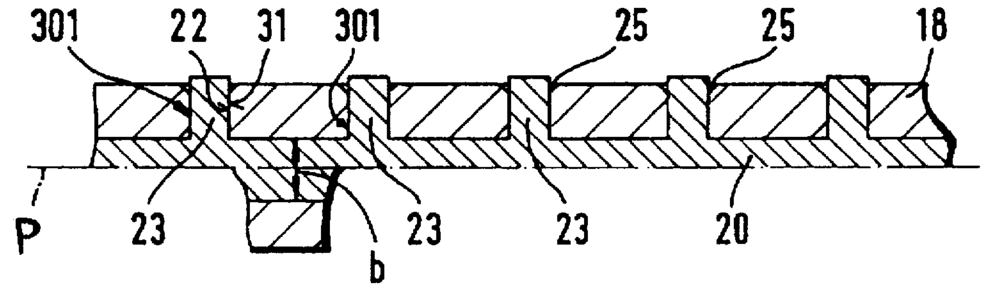
FIG. 6 shows a section along the line VI—VI of FIG. 3.

Instead of recesses 30 it is also possible to provide cutouts 301 which are preferably embodied as stamped holes in the side plates (FIG. 6). The transverse stays 23 of the longitudinal stay 20 are provided with such a length that they extend at least into the outer countersink 25 in which the cutouts 301 open. By compressing the transverse stays 23 a riveting of the longitudinal stay 20 with the side plate 18 is achieved so that a fixed connection is provided. The required number of riveting connections disposed over the length of the longitudinal stay 20 corresponds to the provided number of transverse stays 23 whereby the mantle surface of the transverse stays 23 forms the contact surface 22 which is supported at the support surfaces 31 provided by the inner surface of the cutouts 301. The transverse stay 23 which forms the shaft of the rivet thus also provides the contact surface 22.

Figure 7:
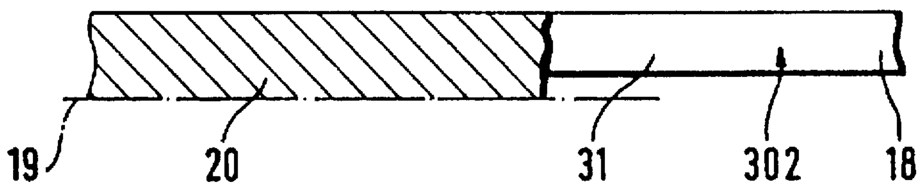
FIG. 7 shows a further embodiment of a guide bar in a representation according to FIG. 4.

In the embodiment according to FIG. 7 a cutout 302 in the form of a slot extending over the length of the longitudinal stay 20 is provided in the side plates 17 and 18. In analogy to the groove 30 shown in FIG. 4, the longitudinal sides of the slots 302 provide the support surfaces 31 for the contact surfaces 22 of the longitudinal stay 20. The longitudinal sides extend perpendicular to the center plane 19 of the guide bar 5.

In the embodiments of FIGS. 4 and 7 the longitudinal stay can be in the form of a pulled manufactured part, respectively, an extruded rod material made of aluminum, an aluminum alloy etc.

When the longitudinal stay 20 is provided with transverse stays 23 as shown in FIGS. 5 and 6, it may be formed as an injection-molded part which can also be comprised of specifically light material such as aluminum or an aluminum alloy. Preferably, when the transverse stays 23 are in the form of rivet bolts, a compressible material of high tensile strength is used. However, the longitudinal stay may also be rolled, forged, or formed in any other suitable manner.

Figure 3:
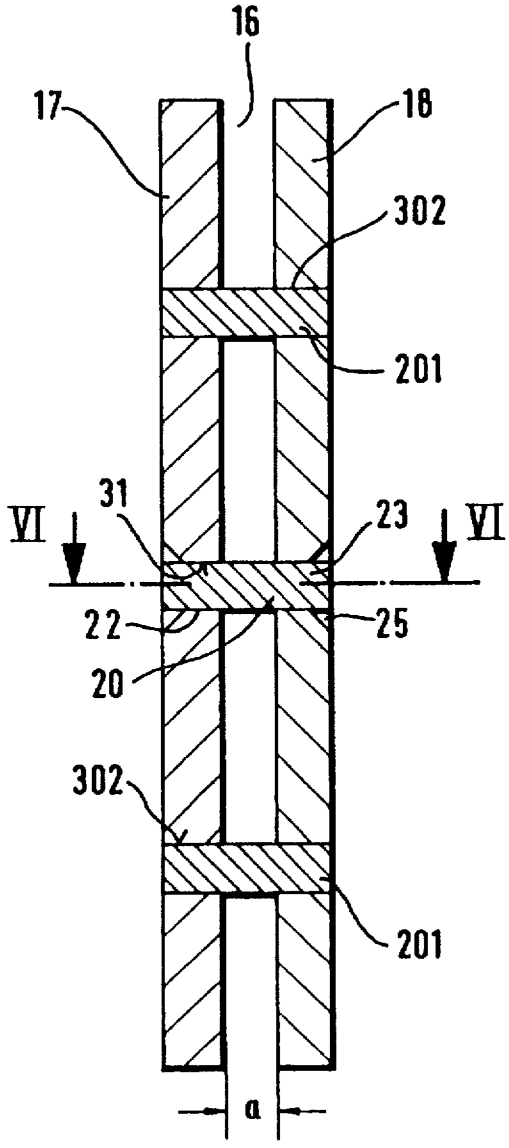
FIG. 3 shows a further embodiment of the guide bar in a representation according to FIG. 2.

As is shown in FIG. 3, a plurality of longitudinal stays 20, 201 can be arranged between the two side plates 17, 18 which stays are preferably positioned parallel to one another and to the longitudinal center axis 15 (FIG. 1). In the embodiment according to FIG. 3 the longitudinal stays 201, corresponding to the representation of FIG. 7, positively engage the side plates while the longitudinal stay 20 is embodied and arranged corresponding to the representation of FIG. 6. By compressing the transverse stays 23 of the centrally arranged longitudinal stay 20 the side plate 17 and 18 are fixedly connected to one another. The width "b" (FIG. 6) of the longitudinal stay 20 determines the distance "a" of the side plate 17 and 18 relative to one another so that the width of the guide groove 16 is constructively set. For fixing the longitudinal stay 201 in the desired position, it can be glued into longitudinal slots 302 of the side plates.

Figure 8:
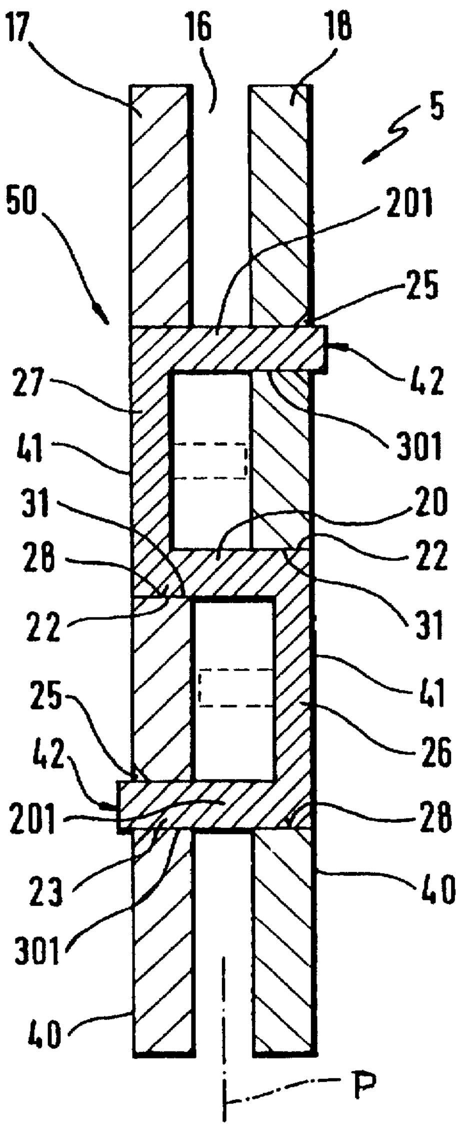
FIG. 8 shows a section of a third embodiment of a guide bar in a representation according to FIG. 2.
Figure 9:
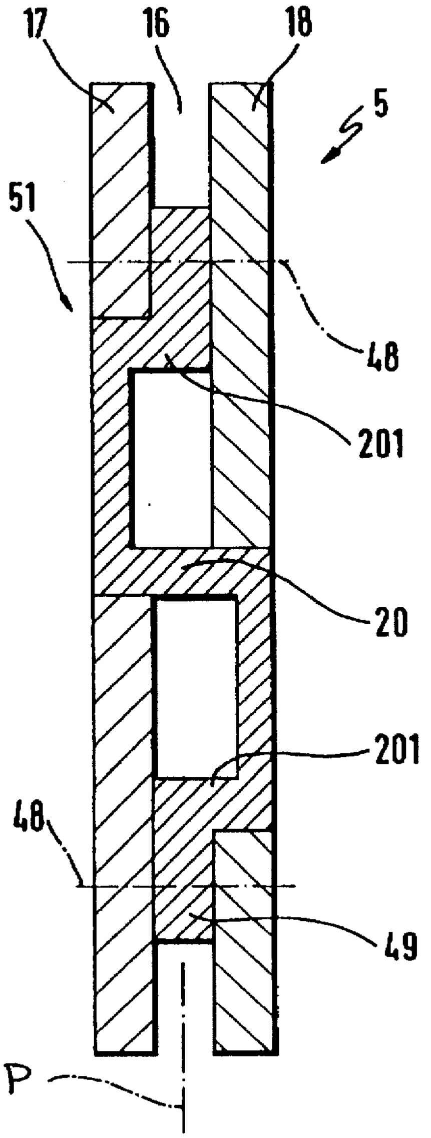
FIG. 9 shows a section of a further embodiment of a guide bar in a representation according to FIG. 2.
Figure 10:
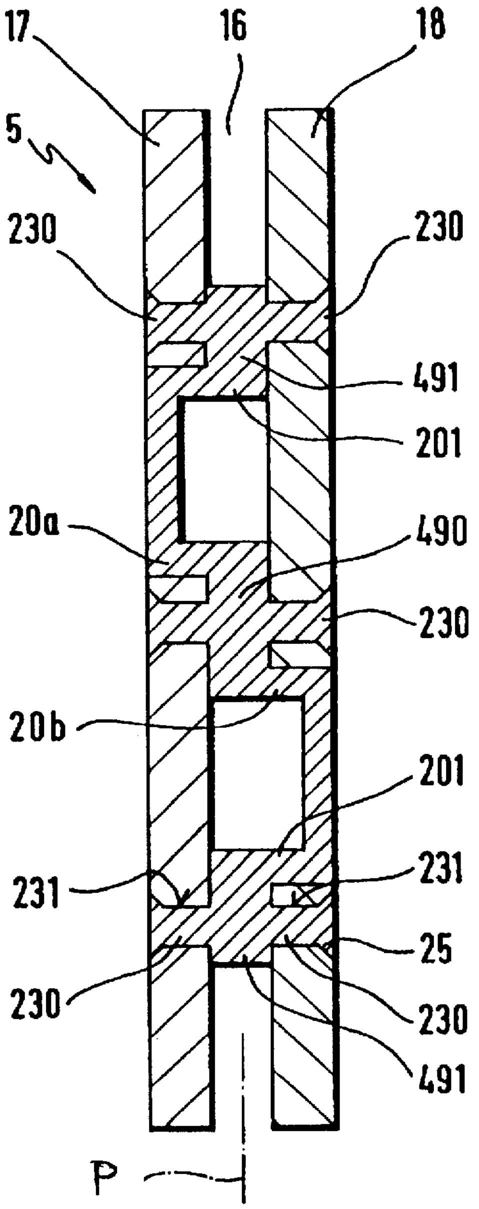
FIG. 10 shows a section of a guide bar with profiled member having a rivet bolt in a representation according to FIG. 2.

In the embodiment of FIGS. 8 to 10 the longitudinal stay 20 is part of a profiled member 50 which is S-shaped. The three sections of the S which extend parallel to one another are positioned perpendicularly to the center plane P of the guide bar 5 and form the three parallel longitudinal stays 20, 201. The connecting sections 26, 27 which are positioned at a right angle to the longitudinal stays 20, 201 are positioned in receiving openings 28 which are provided in the form of slot-shaped openings in the side plate 17 and 18. The exterior sidewall 40 of the side plate 17, respectively, 18 and the exterior sides 41 of the connecting sections 26, 27 form a common exterior side surface of the guide bar 5. Preferably, the receiving opening 28 of one side plate 17 is displaced relative to the receiving opening 28 in the other side plate 18. In the shown embodiment the receiving opening 28 of one side plate is positioned above the central longitudinal axis 15 of the guide bar 5 and the receiving opening 28 of the other side plate 18 is positioned below the longitudinal center axis 15.

As shown in FIG. 8 a connecting section 26, 27 connects the longitudinal edges of the central longitudinal stay 20 with the longitudinal edge of the outwardly positioned longitudinal stay 201. At the free end face 42 of the outwardly positioned longitudinal stay 201 rivet-forming transverse stays 23 are arranged which extend, substantially form-fittingly, through the rivet openings in the form of cutouts 301. The cutouts 301 open at the outer sidewall 40 of the side plates 17, 18 in countersinks 25 for receiving during compression the rivet head which is being formed from the end section of the transverse stay 23 projecting from the cutout 301.

The profiled member 50 is provided with a plurality of contact surfaces. For example, the central longitudinal stay 20 has a contact surface 21 which over the length of the longitudinal stay 20 is supported at a support surface 31 respectively which is provided at the edge of the receiving opening 28. Correspondingly, the outer longitudinal stay 201 is supported at the side plate 18 at the vertical edge of the receiving opening 28 and engages with the transverse stay 23 form-lockingly the other side plate. Via the plane of the side plates 17, 18 a plurality of support surfaces are provided so that a guide bar embodied according to the embodiment of FIG. 8 is provided with a high torsional stiffness.

Instead of the rivet bolts formed by the transverse stays 23 in the embodiment of FIG. 8, the profiled member 51 of FIG. 9 is provided at its free surfaces of the exterior longitudinal stays 201 with rivet flanges 49 which extend in the center plane P of the guide bar between the side plate 17, 18 and which determine the distance of the side plates 17, 18 to one another. This arrangement at the same time determines the width of the guide groove. The connection between the side plates 17, 18 and the profiled member 51 is preferably provided by rivets 48 (only schematically represented by dashed lines) in the embodiment according to FIG. 9. The height of the rivet flanges 49 measured in the center plane P of the guide bar 5 is determined such that the end faces facing the guide groove 16 delimit this guide groove.

The embodiment according to FIG. 10 corresponds to a combination of the embodiments of FIGS. 8 and 9. The outer longitudinal stay 201 has rivet flanges 491 at which transverse stays 230 are provided which extend into corresponding rivet openings 231 of the side plates. Each rivet flange 491 is thus positive and force-lockingly connected with the two side plates 17, 18. The centrally arranged longitudinal stay is divided by the rivet flange 490 into two halves 20*a* and 20*b* connected to one another via the rivet flange 490. This Z-shaped longitudinal stay 20*a*/20*b* is form-lockingly connected with rivet-forming transverse stays 230 to the side plate 17 and 18 in a manner corresponding to the attachment with rivet flanges 491.

Figure 11:
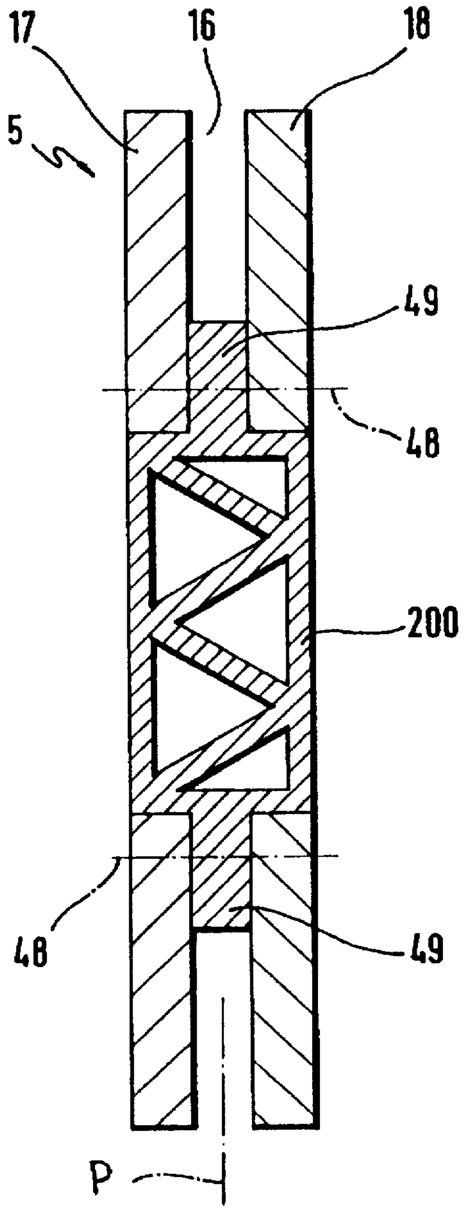
FIG. 11 shows a section of a further embodiment of a guide bar with a hollow member longitudinal stay.

In the embodiment according to FIG. 11 the longitudinal stay 200 is a hollow member which is provided with rivet flanges 49 extending in the center plane P between the side plates 17, 18. Rivets 48 extend through the rivet flanges 49 and thus connect fixedly the side plate 17, 18 with the longitudinal stay 200. This embodiment also provides a fixedly connected composite body as the guide bar 5. As represented in FIG. 1, the longitudinal stay 20 has connected thereto advantageously intermediate plates 120, 120' which in the clamping area of the guide bar 5 as well as the deflecting area ensure the distance between the side plates. For example, the end 20.1 of the longitudinal stay 20 facing the deflecting area has connected thereto an intermediate plate 120, for example, by welding, or forging as a unitary part. The circumferential edge 121 delimits the depth of the guide groove 16 and thus forms the groove bottom. The end 20.2 facing the clamping area is preferably provided with a corresponding intermediate plate 120' which receives the clamping forces without affecting the shape of the guide groove. The edge 121 of this intermediate plate 120 delimits also over a longitudinal segment the depth of the guide groove.

The present invention is, of course, in no way restricted to the specific disclosure of the specification and drawings, but also encompasses any modifications within the scope of the appended claims.

What I claim is:

1. A guide bar for a saw chain of a motor chain saw, said guide bar comprising:

two side plates having a longitudinal extension;

at least one longitudinal stay for fixedly connecting said side plates to one another such that said side plates are positioned substantially congruent and parallel to one another and define a peripheral guide groove therebetween;

said longitudinal stay extending in a direction of said longitudinal extension over most of said longitudinal extension of said side plates;

said longitudinal stay having contact surfaces;

said side plates having support surfaces extending perpendicular to a center plane of said guide bar extending parallel to said side plates; and said contact surfaces resting on said support surfaces.

2. A guide bar according to claim 1, wherein said longitudinal stay is connected to said side plates in a positive locking manner.

3. A guide bar according to claim 1, wherein said longitudinal stay is positioned substantially along a longitudinal center axis of said guide bar.

4. A guide bar according to claim 1, wherein said longitudinal stay is a spacer between said side plates.

5. A guide bar according to claim 1, further comprising fastening means for fastening said longitudinal stay to said side plates.

6. A guide bar for a saw chain of a motor chain saw, said guide bar comprising:

two side plates having a longitudinal extension;

at least one longitudinal stay for fixedly connecting said side plates to one another such that said side plates are positioned substantially congruent and parallel to one another and define a peripheral guide groove therebetween;

said longitudinal stay extending in a direction of said longitudinal extension over most of said longitudinal extension of said side plates;

said longitudinal stay having contact surfaces;

said side plates having support surfaces extending perpendicular to a center plane of said guide bar extending parallel to said side plates;

said contact surfaces resting on said support surfaces.

wherein said longitudinal stay comprises rivet flanges extending between said side plates in said center plane.

7. A guide bar according to claim 6, wherein said rivet flanges are spacers.

8. A guide bar according to claim 1, wherein said longitudinal stay comprises transverse stays extending perpendicular to said center plane, wherein said contact surfaces are located at said transverse stays.

9. A guide bar according to claim 8, wherein said transverse stays are in the form of rivet bolts.

10. A guide bar according to claim 1, wherein a plurality of said longitudinal stays are arranged parallel to one another.

11. A guide bar for a saw chain of a motor chain saw, said guide bar comprising:

two side plates having a longitudinal extension;

at least one longitudinal stay for fixedly connecting said side plates to one another such that said side plates are positioned substantially congruent and parallel to one another and define a peripheral guide groove therebetween;

said longitudinal stay extending in a direction of said longitudinal extension over most of said longitudinal extension of said side plates;

said longitudinal stay having contact surfaces;

said side plates having support surfaces extending perpendicular to a center plane of said guide bar extending parallel to said side plates;

said contact surfaces resting on said support surfaces;

wherein said side plates have recesses and wherein said support surfaces are located at said recesses;

wherein said contact surfaces and said support surfaces extend over the entire length of said longitudinal stay.

12. A guide bar for a saw chain of a motor chain saw, said guide bar comprising:

two side plates having a longitudinal extension;

at least one longitudinal stay for fixedly connecting said side plates to one another such that said side plates are positioned substantially congruent and parallel to one another and define a peripheral guide groove therebetween;

said longitudinal stay extending in a direction of said longitudinal extension over most of said longitudinal extension of said side plates;

said longitudinal stay having contact surfaces;

said side plates having support surfaces extending perpendicular to a center plane of said guide bar extending parallel to said side plates;

said contact surfaces resting on said support surfaces;

wherein said longitudinal stay is a part of a profiled member;

wherein said profiled member is S-shaped and has three parallel sections extending perpendicular to said center plane and two connecting sections extending perpendicular to said three parallel sections for connecting respectively two adjacently arranged ones of said three parallel sections, wherein each one of said connecting sections is positioned in a plane of said side plates.

13. A guide bar according to claim 12, wherein each one of said side plates has a receiving opening for receiving one of said connecting sections, wherein said connecting sections and said receiving openings have a matching shape such that a surface of said connecting sections facing outwardly with respect to said guide bar are flush with an exterior sidewall of said side plates.

14. A guide bar according to claim 13, wherein said receiving opening of one of said side plates is displaced relative to said receiving opening of the other side plate.

15. A guide bar according to claim 14, wherein said receiving opening in said one side plate, when said side plates are positioned vertically and a longitudinal center axis of said guide bar extends horizontally, is positioned above and said other receiving opening is positioned below said longitudinal center axis.

16. A guide bar according to claim 12, wherein:

the outwardly positioned ones of said three parallel sections have free end faces with transverse stays in the form of rivet projections;

said side plates have cutouts in the form of rivet openings;

said transverse stays extend into said cutouts for riveting.

17. A guide bar according to claim 12, wherein the outwardly positioned ones of said three parallel sections have outwardly facing surfaces with outwardly extending rivet flanges extending in said center plane for riveting said side plates to said profiled member.

18. A guide bar according to claim 1, wherein said longitudinal stay is a hollow member.

19. A guide bar according to claim 1, further comprising a first and a second spacing member, wherein:

said longitudinal stay has a first and a second end;

said first spacing member is connected to said first end and said second spacing member is connected to said second end;

said first and second spacing members positioned between said side plates; and said first and second spacing members having an outer edge that delimits the depth of said guide groove.

* * * * *